US008288499B2

(12) United States Patent
Shirai et al.

(10) Patent No.: US 8,288,499 B2
(45) Date of Patent: Oct. 16, 2012

(54) POLYESTER FOR TONER

(75) Inventors: Eiji Shirai, Wakayama (JP); Yoshitomo Kimura, Wakayama (JP); Yasunori Inagaki, Wakayama (JP)

(73) Assignee: Kao Corporation, Tokyo (JP)

( * ) Notice: Subject to any disclaimer, the term of this patent is extended or adjusted under 35 U.S.C. 154(b) by 294 days.

(21) Appl. No.: 11/967,629

(22) Filed: Dec. 31, 2007

(65) Prior Publication Data

US 2008/0182194 A1 Jul. 31, 2008

(30) Foreign Application Priority Data

Jan. 31, 2007 (JP) ................................ 2007-021685

(51) Int. Cl.
*C08G 61/02* (2006.01)
*G03G 9/00* (2006.01)

(52) U.S. Cl. ........ 528/86; 528/176; 528/195; 430/109.4

(58) Field of Classification Search .................... 528/86, 528/176, 195; 430/109.4
See application file for complete search history.

(56) References Cited

U.S. PATENT DOCUMENTS

| | | | | |
|---|---|---|---|---|
| 6,007,958 | A * | 12/1999 | Ito et al. | 430/109.4 |
| 6,326,115 | B1 | 12/2001 | Nakanishi et al. | |
| 6,756,171 | B2 | 6/2004 | Roh et al. | |
| 6,992,150 | B2 | 1/2006 | Nakanishi et al. | |
| 7,351,510 | B2 | 4/2008 | Shirai et al. | |
| 2005/0147911 | A1 * | 7/2005 | Shirai et al. | 430/109.4 |

FOREIGN PATENT DOCUMENTS

| | | |
|---|---|---|
| JP | 8-20636 | 1/1996 |
| JP | 9-73189 | 3/1997 |
| JP | 10-239903 | 9/1998 |
| JP | 11-133668 | 5/1999 |
| JP | 2001-330994 | 11/2001 |
| JP | 2002-202634 | 7/2002 |
| JP | 2003-43741 | 2/2003 |
| JP | 2005-195805 | 7/2005 |
| JP | 2006-301128 | 11/2006 |

OTHER PUBLICATIONS

U.S. Appl. No. 12/297,946, filed Oct. 21, 2008, Kimura, et al.
Office Action issued Apr. 22, 2011 in Japanese Patent Application No. 2007-021685 (with English translation).

* cited by examiner

*Primary Examiner* — Ling Choi
*Assistant Examiner* — Gennadiy Mesh
(74) *Attorney, Agent, or Firm* — Oblon, Spivak, McClelland, Maier & Neustadt, L.L.P.

(57) ABSTRACT

A polyester for a toner having a softening point of from 70° to 110° C. and a glass transition temperature of from 38° to 60° C., obtained by polycondensing an alcohol component containing a propylene oxide adduct of bisphenol A and an ethylene oxide adduct of bisphenol A in a total amount of 80% by mole or more, with a carboxylic acid component, wherein the propylene oxide adduct has an average number of moles of from 2.0 to 2.4, and the ethylene oxide adduct has an average number of moles of from 2.5 to 4.2. The polyester for a toner of the present invention is suitably used as a resin binder of a toner, or the like, used for, for example, developing a latent image formed in electrophotography, electrostatic recording method, electrostatic printing method, or the like.

9 Claims, No Drawings

POLYESTER FOR TONER

FIELD OF THE INVENTION

The present invention relates to a polyester for a toner used for, for example, developing a latent image formed in electrophotography, electrostatic recording method, electrostatic printing method or the like; a process for preparing the polyester; and a toner containing the polyester.

BACKGROUND OF THE INVENTION

With the progress of an electrophotographic technology, a development of a toner which is excellent in low-temperature fixing ability has been desired. JP2003-43741 A discloses a polyester toner containing a 2 moles adduct of bisphenol A as a main component, and JP2006-301128 A discloses a low-softening point polyester toner proactively using a propylene oxide 3 moles adduct of a propylene oxide adduct of bisphenol A.

SUMMARY OF THE INVENTION

The present invention relates to:

[1] a polyester for a toner having a softening point of from 70° to 110° C. and a glass transition temperature of from 38° to 60° C., obtained by polycondensing an alcohol component containing a propylene oxide adduct of bisphenol A and an ethylene oxide adduct of bisphenol A in a total amount of 80% by mole or more, with a carboxylic acid component, wherein the propylene oxide adduct has an average number of moles of from 2.0 to 2.4, and the ethylene oxide adduct has an average number of moles of from 2.5 to 4.2;

[2] a process for preparing a polyester for a toner having a softening point of from 70° to 110° C. and a glass transition temperature of from 38° to 60° C., including the step of polycondensing an alcohol component containing a propylene oxide adduct of bisphenol A and an ethylene oxide adduct of bisphenol A in a total amount of 80% by mole or more, with a carboxylic acid component, wherein the propylene oxide adduct has an average number of moles of from 2.0 to 2.4, and the ethylene oxide adduct has an average number of moles of from 2.5 to 4.2; and

[3] a toner containing the polyester as defined in the above [1].

DETAILED DESCRIPTION OF THE INVENTION

The present invention relates to a polyester for a toner, wherein the polyester has toughness while having a low-softening point, whereby the generation of fine powders is reduced, and the toner is excellent in low-temperature fixing ability.

The polyester for a toner of the present invention has toughness while having a low-softening point, whereby excellent effects that the generation of fine powders can be reduced, and that the toner is excellent in low-temperature fixing ability are exhibited.

These and other advantages of the present invention will be apparent from the following description.

There has been desired a toner having a small particle size, from the viewpoint of achieving higher image qualities. However, when a low-softening point resin is melt-kneaded and pulverized to prepare a toner having a small particle size, due to brittleness of a low-softening point resin, fine powers are more likely to be generated, and the toner has a broad particle size distribution, so that it is difficult to obtain an image with excellent image quality.

Therefore, as a result of intensive studies in view of obtaining an image with excellent image quality even upon using a low-softening point resin, the present inventors have confirmed that, in a low-softening point resin, a monomer having a specified average number of moles of a propylene oxide adduct of bisphenol A in which all alkylene groups of an alkylene oxide adduct of bisphenol A are propylene groups, and a monomer having an average number of moles of an ethylene oxide adduct of bisphenol A in which all the above-mentioned alkylene groups are ethylene groups, which is higher than the average number of moles of the above-mentioned propylene oxide adduct are used together, whereby a resin having toughness while having a low-softening point is obtained, so that the generation of fine powders can be reduced, and the toner is excellent in low-temperature fixing ability.

In addition, when a toner is prepared by using in admixture of a high-softening point resin and a low-softening point resin, there is a problem that a resin composition in the prepared toner is different from a raw material composition since the toner often cracks at a part of the brittle low-softening point resin, and fine powders to be generated are mainly composed of the low-softening point resin. It has been also clarified that, the resin of the present invention is used, whereby pulverizabilities of a low-softening point resin and a high-softening point resin can be approximated each other, so that the above-mentioned problem can be solved.

The present invention is a low-softening point polyester for a toner obtained by polycondensing an alcohol component containing a propylene oxide adduct of bisphenol A (which may be hereinafter referred to as PO adduct), and an ethylene oxide adduct of bisphenol A (which may be hereinafter referred to as EO adduct) in a total amount of 80% by mole or more, with a carboxylic acid component, and one of the significant features of the present invention resides in that each of an average number of moles of the PO adduct and an average number of moles of the EO adduct is specified.

Here, a PO adduct and an EO adduct in the present invention refer to an alkylene oxide adduct of bisphenol A represented by the formula (I):

(I)

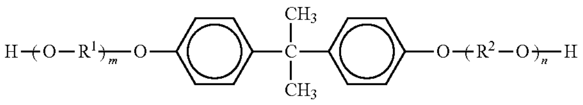

wherein each of $R^1$ and $R^2$ is independently an alkylene group having 2 or 3 carbon atoms; m and n are positive numbers showing average numbers of moles of an alkyleneoxy group added; and a sum of m and n is from 1 to 16, and a propylene oxide adduct in which the above-mentioned $R^1$ and $R^2$ are propylene groups is defined as a PO adduct and an ethylene oxide adduct in which the above-mentioned $R^1$ and $R^2$ are ethylene groups is defined as an EO adduct. Here, the PO adduct in the present invention may contain other alkylene oxide adduct including the ethylene oxide adduct, within the range which would not impair the effects of the present invention. The EO adduct in the present invention may contain other alkylene oxide adduct including the propylene oxide adduct, within the range which would not impair the effects of the present invention.

Since a low-softening point resin is softened at relatively low temperature, there is a high need for securing mobility of a main backbone part of the resin in a temperature range between a glass transition temperature and a softening point, from the viewpoint of low-temperature fixing ability. On the other hand, when an alkylene oxide adduct of bisphenol A is used for a monomer of a resin, it is considered that, the higher the number of moles of an alkyleneoxy group added is, the more actively the main chain of a polymer moves, so that excellent low temperature fixing ability is obtained. However, among alkyleneoxy groups, in a reaction system in which both a monomer to which propyleneoxy groups are added and a monomer to which ethyleneoxy groups are added reside, when numbers of moles of both groups are almost equal, a reaction among monomers is likely to be imbalanced due to poor reactivity of the propyleneoxy group as compared to that of the ethyleneoxy group. As a result, it is considered that, a monomer distribution in the polymer is inhomogenous, it is likely to induce lowering of a molecular weight during kneading, and fine powders are more likely to be generated. Therefore, it is considered that, the number of moles of ethyleneoxy group is set to be larger than the number of moles of propyleneoxy group, specifically, the number of moles of ethylene oxide adduct to which only ethyleneoxy group is added is set to be larger than the number of moles of propylene oxide adduct to which only propyleneoxy group is added, whereby reactivity of the both groups are approximated each other, a monomer distribution in the polymer can be homogenized, toughness of the resin is increased, lowering of a molecular weight during kneading is prevented, and the generation of fine powders can be reduced.

The polyester for a toner of the present invention is obtained by polycondensing an alcohol component containing the PO adduct and the EO adduct in a total amount of 80% by mole or more, and preferably 95% by mole or more, with a carboxylic acid component, from the viewpoint of low-temperature fixing ability.

In addition, the PO adduct is contained in an amount of preferably from 0.5 to 40% by mole, more preferably from 3 to 32% by mole, and even more preferably from 5 to 25% by mole, of the alcohol component. The EO adduct is contained in an amount of preferably from 40 to 99% by mole, more preferably from 68 to 97% by mole, and even more preferably from 75 to 95% by mole, of the alcohol component.

It is desired that a molar ratio of the PO adduct to the EO adduct, i.e., PO adduct/EO adduct, is preferably from 1/99 to 40/60, more preferably from 5/95 to 35/65, and even more preferably from 5/95 to 30/70.

In the present invention, in order to approximate reactivity of the PO adduct and the EO adduct each other and inhibit lowering of a molecular weight during kneading, it is required that the number of moles of ethylene oxide added is larger than the number of moles of propylene oxide added. The PO adduct has an average number of moles of from 2.0 to 2.4, preferably from 2.1 to 2.3, and more preferably from 2.1 to 2.25. The EO adduct has an average number of moles of from 2.5 to 4.2, preferably from 2.6 to 3.5, and more preferably from 2.7 to 3.1. In the present specification, an average number of moles means an average number of moles of each propyleneoxy group added or ethyleneoxy group added, based on 1 mole of bisphenol A.

A ratio of an average number of moles of the PO adduct (a) and an average number of moles of the EO adduct (b), i.e., b/a, is preferably from 1.1 to 1.9, more preferably from 1.2 to 1.6, and even more preferably from 1.2 to 1.4. Here, when two or more kinds of the PO adduct and/or the EO adduct has been used, an average number of moles of the PO adduct (a) refers to a weighed average number of moles of the PO adduct, and an average number of moles of the EO adduct (b) refers to a weighed average number of moles of the EO adduct.

A method of preparing the PO adduct and the EO adduct includes, for example, a method including the step of adding to bisphenol A an appropriate amount of propylene oxide or ethylene oxide according to a desired average number of moles, to be added in the presence of a catalyst, and the like. After the addition reaction, the reaction mixture may be matured for a given period of time as desired. In addition, a distribution of the number of moles of propylene oxide or ethylene oxide added in an adduct to be obtained is often affected by the amount of the catalyst and the temperature of the addition reaction, and may be affected also by the maturing time. For example, in cases such as the amount of the catalyst used is large, the temperature of the addition reaction is high, or the maturing time is long, a distribution of the number of moles of each adduct is likely to be broad.

The catalyst includes basic catalysts such as potassium hydroxide, sodium hydroxide, and the like; acid catalysts such as boron trifluoride, aluminum chloride, and the like; and the like. The catalyst is used in an amount of preferably from 0.01 to 10 parts by weight, and more preferably from 0.1 to 5 parts by weight, based on 100 parts by weight of bisphenol A used.

The temperature of the addition reaction is preferably from 20° to 200° C., and more preferably from 100° to 140° C., from the viewpoint of reaction rate and quality. The pressure of the addition reaction is preferably from 0.005 to 0.9 MPa, and more preferably from 0.01 to 0.6 MPa.

The maturing time after the addition is preferably from 0.1 to 10 hours, and more preferably from 0.5 to 5 hours.

The dihydric alcohol other than the alkylene oxide adduct of bisphenol A represented by the formula (I) includes ethylene glycol, 1,2-propylene glycol, 1,4-butanediol, neopentyl glycol, polyethylene glycol, polypropylene glycol, hydrogenated bisphenol A, and the like.

On the other hand, the carboxylic acid component includes aromatic dicarboxylic acids such as phthalic acid, isophthalic acid, and terephthalic acid; aliphatic dicarboxylic acids such as oxalic acid, malonic acid, maleic acid, fumaric acid, citraconic acid, itaconic acid, glutaconic acid, succinic acid, adipic acid, and a substituted succinic acid of which substituent is an alkyl group having 1 to 20 carbon atoms or an alkenyl group having 2 to 20 carbon atoms such as dodecenylsuccinic acid or octenylsuccinic acid; and dicarboxylic acid compounds such as acid anhydrides thereof and alkyl (1 to 3 carbon atoms) esters thereof. Among them, an aromatic dicarboxylic acid is preferable, and terephthalic acid is more preferable, from the viewpoint of pulverizability.

Terephthalic acid is contained in an amount of preferably from 67 to 90% by mole, and more preferably from 77 to 88% by mole, of the carboxylic acid component.

In addition, in the present invention, the alcohol component may contain a trihydric or higher polyhydric alcohol, and the carboxylic acid component may contain a tricarboxylic or higher polycarboxylic acid compound, from the viewpoint of controlling the molecular weight distribution. The polyhydric alcohol includes, for example, sorbitol, pentaerythritol, glycerol, trimethylolpropane, and the like. The polycarboxylic acid compound includes, for example, 1,2,4-benzenetricarboxylic acid (trimellitic acid), 2,5,7-naphthalenetricarboxylic acid, pyromellitic acid, acid anhydrides thereof, lower alkyl (1 to 3 carbon atoms) esters thereof, and the like. Among them, trimellitic acid is preferable from the viewpoint of reactivity.

The tricarboxylic or higher polycarboxylic acid compound is contained in an amount of preferably from 10 to 50% by mole, more preferably from 10 to 40% by mole, and even more preferably from 10 to 35% by mole, of the carboxylic acid component, from the viewpoint of pulverizability.

The trivalent or higher raw material monomers (the trihydric or higher polyhydric alcohol and the tricarboxylic or higher polycarboxylic acid compound) are contained in an amount of preferably from 1 to 25% by mole, more preferably from 3 to 23% by mole, and even more preferably from 5 to 21% by mole, of the entire raw material monomers.

Here, the alcohol component may properly contain a monohydric alcohol, and the carboxylic acid component may properly contain a monocarboxylic acid compound, from the viewpoint of adjusting the molecular weight and improving offset resistance.

The polycondensation of the alcohol component and the carboxylic acid component may be carried out by subjecting all the materials of the alcohol component and the carboxylic acid component to a reaction at once. It is preferable that, the divalent raw material monomers are reacted, and thereafter the trivalent or higher raw material monomers are reacted, from the viewpoint of controlling the molecular weight distribution.

In addition, the polycondensation of the alcohol component and the carboxylic acid component can be carried out, for example, at a temperature of from 180° to 250° C. in an inert gas atmosphere, and is preferable to be carried out in the presence of an esterification catalyst, from the viewpoint of more remarkably exhibiting the effects of the present invention. The esterification catalyst includes dibutyltin oxide, a titanium compound, a tin (II) compound without having a Sn—C bond, and the like. These esterification catalysts are used alone or in admixture of two or more kinds. Among them, a titanium compound and a tin (II) compound without having a Sn—C bond are preferable, from the viewpoint of more remarkably exhibiting the effects of the present invention.

As the titanium compound, a titanium compound having a Ti—O bond is preferable, and a compound having an alkoxy group, alkenyloxy group or acyloxy group, each having a total number of carbon atoms of from 1 to 28 is more preferable.

As the tin (II) compound without having a Sn—C bond, a tin (II) compound having a Sn—O bond, a tin (II) compound having a Sn—X (X is a halogen atom) bond, or the like is preferable, and a tin (II) compound having a Sn—O bond is more preferable.

The tin (II) compound having a Sn—O bond includes tin (II) carboxylates with a carboxylic acid group having 2 to 28 carbon atoms such as, tin (II) oxalate, tin (II) acetate, tin (II) octanoate, tin (II) octylate, tin (II) laurate, tin (II) stearate, and tin (II) oleate; alkoxytins (II) with an alkoxy group having 2 to 28 carbon atoms such as, octyloxytin (II), lauroxytin (II), stearoxytin (II), oleyloxytin (II); tin (II) oxide; tin (II) sulfate; and the like. The tin (II) compound having a Sn—X (X is a halogen atom) bond includes tin (II) halides such as tin (II) chloride, and tin (II) bromide; and the like. Among them, tin (II) fatty acid salts represented by $(R^1COO)_2Sn$, wherein $R^1$ is an alkyl group or alkenyl group having 5 to 19 carbon atoms, alkoxytins (II) represented by $(R^2O)_2Sn$, wherein $R^2$ is an alkyl group or alkenyl group having 6 to 20 carbon atoms, and tin (II) oxide represented by SnO are preferable, tin (II) fatty acid salts represented by $(R^1COO)_2Sn$ and tin (II) oxide are more preferable, and tin (II) octanoate, tin (II) octylate, tin (II) stearate, and tin (II) oxide are even more preferable, from the viewpoint of the effect of initial rise of charges and catalytic capability.

The esterification catalyst resides in the reaction system in an amount of preferably from 0.05 to 1 parts by weight, and more preferably from 0.1 to 0.8 parts by weight, based on 100 parts by weight of a total amount of the alcohol component and the carboxylic acid component.

Incidentally, in the present invention, the polyester may be a polyester that has been modified to an extent that the properties of the polyester are not substantially impaired. As a modified polyester, a polyester that has been grafted or blocked with phenol, urethane, epoxy, or the like according to the method described in JP-A-Hei-11-133668, JP-A-Hei-10-239903, JP-A-Hei-8-20636, or the like is exemplified.

The polyester has a glass transition temperature of from 38° to 60° C., preferably from 40° to 55° C., and more preferably from 42° to 50° C., from the viewpoint of fixing ability and storage property. In the present specification, a glass transition temperature is determined according to the method described in Examples set forth below.

The polyester has a softening point of from 70° to 110° C., preferably from 75° to 105° C., more preferably from 80° to 100° C., and even more preferably from 80° to 95° C., from the viewpoint of fixing ability. In the present specification, a softening point is determined according to the method described in Examples set forth below.

The toner of the present invention contains the low-softening point polyester of the present invention. It is preferable that the toner of the present invention further contains a high-softening point polyester having a softening point of preferably from 125° to 160° C., more preferably from 130° to 155° C., and even more preferably from 135° to 150° C., from the viewpoint of securing non-offset range and controlling the molecular weight distribution. Incidentally, the polyester of the present invention may be contained as a polyester resin such as a polyester-polyamide, or a composite resin containing two or more resin components. The composite resin refers to a resin in which a polycondensation resin such as a polyester, or a polyester-polyamide, and an addition polymerization resin such as a vinyl polymer-based resin are partially chemically bonded to each other. The composite resin may be obtained from two or more resins as raw materials, the composite resin may be obtained from one kind of resin and raw material monomers for the other resin, or further the composite resin may be obtained from a mixture of raw material monomers of two or more resins. In order to efficiently obtain a composite resin, those obtained from a mixture of raw material monomers of two or more resins are preferable.

The difference of softening points of the high-softening point polyester and the low-softening point polyester is preferably from 20° to 60° C., more preferably from 20° to 55° C., and even more preferably from 20° to 50° C., from the viewpoint of fixing ability and storage property.

A weight ratio of the high-softening point polyester to the low-softening point polyester, i.e., high-softening point polyester/low-softening point polyester, is preferably from 1/9 to 8/2, more preferably from 2/8 to 7/3, and even more preferably from 3/7 to 6/4.

When a resin binder contains two or more polyesters, the resin binder has an average softening point of preferably from 100° to 160° C., more preferably from 110° to 155° C., and even more preferably from 115° to 150° C. In the present specification, an average softening point refers to a weighed average softening point.

In addition, besides the low-softening point polyester of the present invention and the above-mentioned high-softening point polyester, the toner of the present invention may contain other resin binder within the range which would not impair the effects of the present invention. Other resin binder includes known resins used for a toner, for example, styrene-acrylic resins, epoxy resins, polycarbonates, polyurethanes, and the like. The low-softening point polyester of the present invention is contained in an amount of preferably from 50 to 100% by weight, of the resin binder, from the viewpoint of low-temperature fixing ability, but not particularly limited thereto.

The toners of the present invention may properly contain an additive such as a colorant, a releasing agent, a charge control agent, an electric conductivity modifier, an extender, a reinforcing filler such as a fibrous substance, an antioxidant, or an anti-aging agent.

The colorant is not particularly limited, and includes known colorants, which can be properly selected according to its purposes. Specifically, the colorant includes a variety of pigments such as carbon blacks, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Aniline Blue, ultramarine blue, Calco Oil Blue, Methylene Blue Chloride, Phthalocyanine Blue, Phthalocyanine Green, and Malachite Green Oxalate; and various dyes such as Acridine dyes, Xanthene dyes, azo dyes, benzoquinone dyes, Azine dyes, anthraquinone dyes, indigo dyes, thioindigo dyes, Phthalocyanine dyes, Aniline Black dyes, polymethine dyes, triphenylmethane dyes, diphenylmethane dyes, thiazine dyes, and thiazole dyes, and these pigments and dyes can be used alone or in admixture of two or more kinds. The colorant is contained in an amount of preferably from 1 to 40 parts by weight, and more preferably from 2 to 10 parts by weight, based on 100 parts by weight of the resin binder.

The releasing agent includes low-molecular weight polyolefins such as polyethylene, polypropylene, and polybutene; silicones; fatty acid amides such as oleic amide, erucic amide, recinoleic acid amide, and stearic acid amide; plant-derived waxes such as carnauba wax, rice wax, candelilla wax, haze wax, and jojoba oil; animal-derived waxes such as beeswax; mineral and petroleum waxes such as montan wax, ozokerite, sericite, paraffin wax, microcrystalline wax, and Fischer-Tropsch wax; and the like. These releasing agents can be used alone or in admixture of two or more kinds. The releasing agent is contained in an amount of preferably from 0.5 to 10 parts by weight, and more preferably from 1 to 6 parts by weight, based on 100 parts by weight of the resin binder.

The toner of the present invention may be a toner obtained by any of the conventionally known methods such as a melt-kneading method, an emulsion phase-inversion method, and a polymerization method. A pulverized toner obtained by the melt-kneading method is preferable, from the viewpoint of productivity and dispersibility of the additive. In the case of the pulverized toner, the toner can be prepared by the method including the steps of homogeneously mixing raw materials such as a resin binder, and a colorant in a mixer such as a Henschel mixer, thereafter melt-kneading with a closed kneader, a single-screw or twin-screw extruder, an open-roller type kneader, or the like, cooling, pulverizing and classifying the product. The toner has a volume-median particle size ($D_{50}$) of preferably from 2 to 7 μm, and more preferably from 3 to 7 μm. In the present specification, the volume-median particle size ($D_{50}$) means a particle size corresponding to a 50% cumulative volume frequency calculated by the volume fraction of the toner, counting from the side of smaller particle size.

The toner of the present invention can be used as a toner for monocomponent development or as a two-component developer by mixing the toner with a carrier.

EXAMPLES

The following examples further describe and demonstrate embodiments of the present invention. The examples are given solely for the purposes of illustration and are not to be construed as limitations of the present invention.

[Softening Point of Resin]

The softening point refers to a temperature at which a half the amount of the sample flows out when plotting a downward movement of a plunger against temperature, as measured by using a flow tester (CAPILLARY RHEOMETER "CFT-500D," commercially available from Shimadzu Corporation), in which a 1 g sample is extruded through a nozzle having a diameter of 1 mm and a length of 1 mm while heating the sample so as to raise the temperature at a rate of 6° C./min and applying a load of 1.96 MPa thereto with the plunger.

[Glass Transition Temperature of Resin]

The glass transition temperature refers to a temperature of an intersection of the extension of the baseline of equal to or lower than the temperature of the endothermic highest peak and the tangential line showing the maximum inclination between the kick-off of the peak and the top of the peak, which is determined using a differential scanning calorimeter ("DSC 210," commercially available from Seiko Instruments, Inc.), by raising its temperature to 200° C., cooling the sample from this temperature to 0° C. at a cooling rate of 10° C./min, and thereafter raising the temperature of the sample at a heating rate of 10° C./min.

[Volume-Median Particle Size ($D_{50}$) and Number-Particle Size Distribution of Toner]

Measuring Apparatus: Coulter Multisizer II (commercially available from Beckman Coulter K.K.)

Aperture Diameter: 50 μm

Analyzing Software: Coulter Multisizer AccuComp Ver. 1.19 (commercially available from Beckman Coulter K.K.)

Electrolytic Solution: "Isotone II" (commercially available from Beckman Coulter K.K.)

Dispersion: "EMULGEN 109P" (commercially available from Kao Corporation, polyoxyethylene lauryl ether, HLB: 13.6) is dissolved in the above electrolytic solution so as to have a concentration of 5% by weight, to give a dispersion.

Dispersion Conditions: Ten milligrams of a test sample is added to 5 mL of the above dispersion, and the resulting mixture is dispersed in an ultrasonic disperser for 1 minute. Thereafter, 25 mL of the electrolytic solution is added thereto, and the resulting mixture is dispersed in the ultrasonic disperser for another 1 minute, to give a sample dispersion.

Measurement Conditions: The above sample dispersion is adjusted so as to have a concentration at which the particle sizes of 30,000 particles can be determined in 20 seconds by adding 100 mL of the above electrolytic solution to the above sample dispersion. Thereafter, the particle sizes of 30,000 particles are determined to obtain a volume-median particle size ($D_{50}$) and a number-particle size distribution from the particle size distribution.

[Content of Adduct per Number of Moles in Alkylene Oxide Adduct]

The content of an adduct is determined according to the following method using GC (gas chromatograph).

(1) Pretreatment (Silylation of Sample)

From 40 to 60 mg of a sample is taken in a 5 mL specimen vial, and 1 mL of a silylating agent (TH, commercially available from KANTO CHEMICAL CO., INC.) is added thereto. Thereafter, the mixture is dissolved in a hot-water bath (from 50° to 80° C.), and then shaken to carry out silylation. The reaction mixture is allowed to stand, and thereafter, a separated supernatant is defined as a determination sample.

(2) Measuring Apparatus

GC: GC14B (commercially available from Shimadzu Corporation)

(3) Measuring Conditions

Column: Filler, commercially available from GL Sciences Inc.,

Silicon OV-17 (60/80 mesh), Length 1 m×Diameter 2.6 mm

Carrier: He

Flow Rate Condition: 1 mL/min

Inlet Temperature: 300° C.

Oven Temperature Conditions

Initial Temperature: 100° C.

Rate of Raising Temperature: 8° C./min

Terminal Temperature: 300° C.

Retention Time: 25 min (4) Determination of Quantity of Adduct

A weight ratio is obtained from a peak area corresponding to each component detected with gas chromatograph, and the weight ratio is calculated as a molecular weight to obtain a molar ratio.

Production Example 1

For Ethylene Oxide Adduct

An autoclave with functions of stirring and controlling the temperature was charged with 228 g (1 mole) of bisphenol A and 2 g of potassium hydroxide. The ethylene oxide shown in Table 1 was introduced therein at 135° C. under the pressure ranged from 0.1 to 0.4 MPa, and thereafter the mixture was subjected to addition reaction for 3 hours. In the reaction product was put 16 g of an adsorbent "Kyoward 600" ($2MgO.6SiO_2.XH_2O$, commercially available from Kyowa Chemical Industry Co., Ltd.), and the mixture was stirred at 90° C. for 30 minutes to mature. Thereafter, the resulting mixture was filtered to give an ethylene oxide adduct of bisphenol A (EO-1). In addition, in the same manner as above, the amount of ethylene oxide was adjusted according to a desired average number of moles, to give ethylene oxide adducts (EO-2 to 3). The content of ethylene oxide each mole adduct of each adduct is shown in Table 1.

Production Example 1

For Propylene Oxide Adduct

An autoclave with functions of stirring and controlling the temperature was charged with 228 g (1 mole) of bisphenol A and 2 g of potassium hydroxide. The propylene oxide shown in Table 2 was introduced therein at 135° C. under the pressure ranged from 0.1 to 0.4 MPa, and thereafter the mixture was subjected to addition reaction for 3 hours. In the reaction product was put 16 g of an adsorbent "Kyoward 600" ($2MgO.6SiO_2.XH_2O$, commercially available from Kyowa Chemical Industry Co., Ltd.), and the mixture was stirred at 90° C. for 30 minutes to mature. Thereafter, the resulting mixture was filtered to give a propylene oxide adduct of bisphenol A (PO-1). The content of propylene oxide each mole adduct of the adduct is shown in Table 2.

TABLE 1

| | EO-1 | EO-2 | EO-3 |
|---|---|---|---|
| Amount of Ethylene Oxide (g)*[1] | 97 | 132 | 119 |
| Content of Ethylene Oxide 2 Moles Adduct (% by Mole) | 29 | 51 | 78 |
| Content of Ethylene Oxide 3 Moles Adduct (% by Mole) | 44 | 31 | 22 |
| Content of Ethylene Oxide 4 Moles Adduct (% by Mole) | 21 | 15 | — |
| Content of Ethylene Oxide 5 Moles Adduct (% by Mole) | 6 | 3 | — |
| Average Number of Moles | 3.0 | 2.7 | 2.2 |

*[1]: An amount based on 1 mole of bisphenol A

TABLE 2

| | PO-1 |
|---|---|
| Amount of Propylene Oxide (g)*[1] | 139 |
| Content of Propylene Oxide 2 Moles Adduct (% by Mole) | 79 |
| Content of Propylene Oxide 3 Moles Adduct (% by Mole) | 21 |
| Average Number of Moles | 2.2 |

*[1]: An amount based on 1 mole of bisphenol A

Examples 1 to 6 and Comparative Examples 1 to 4

Resins

A 5-liter four-necked flask equipped with a nitrogen inlet tube, a dehydration tube, a stirrer, and a thermocouple was charged with the raw material monomers shown in Table 3 or 4 other than trimellitic acid, and 20 g of tin (II) octylate. The ingredients in the flask were reacted at 230° C. over a period of 8 hours, and thereafter reacted in vacuo at 8.3 kPa for 1 hour. Further, the trimellitic acid shown in Table 3 or 4 was added thereto at 210° C. and the mixture was reacted at an atmospheric pressure (101.3 kPa) for 1 hour. Thereafter, the mixture was reacted at 8.3 kPa until a desired softening point was reached, to give resins of Examples 1 to 6 and Comparative Examples 1 to 4 (Resins A to J).

TABLE 3

| | Examples | | | | | |
|---|---|---|---|---|---|---|
| | 1 (Resin A) | 2 (Resin B) | 3 (Resin C) | 4 (Resin D) | 5 (Resin E) | 6 (Resin F) |
| Resin Monomers | | | | | | |
| Propylene Oxide Adduct | PO-1 = 676 g (20) | PO-1 = 676 g (20) | PO-1 = 169 g (5) | PO-1 = 1183 g (35) | PO-1 = 2366 g (70) | PO-1 = 676 g (20) |
| Ethylene Oxide Adduct | EO-1 = 2752 g (80) | EO-1 = 2752 g (80) | EO-1 = 3268 g (95) | EO-1 = 2236 g (65) | EO-1 = 1032 g (30) | EO-2 = 2632 g (80) |
| Terephthalic Acid | 1162 g (70) | 1079 g (65) | 1162 g (70) | 1112 g (67) | 1079 g (65) | 1245 g (75) |
| Trimellitic Acid | 144 g (10) | 144 g (10) | 187 g (13) | 144 g (10) | 173 g (12) | 173 g (12) |
| b/a*[1] | 1.38 | 1.38 | 1.38 | 1.38 | 1.38 | 1.22 |

TABLE 3-continued

| | Examples | | | | | |
|---|---|---|---|---|---|---|
| | 1 (Resin A) | 2 (Resin B) | 3 (Resin C) | 4 (Resin D) | 5 (Resin E) | 6 (Resin F) |
| Physical Properties | | | | | | |
| Softening Point (° C.) | 95 | 85 | 102 | 90 | 90 | 95 |
| Glass Transition Temp. (° C.) | 47 | 42 | 49 | 50 | 53 | 52 |

Note)
The figure in parenthesis of resin monomers represents a molar ratio when the total amount of the alcohol component is defined as 100 moles.
*[1]: average number of moles of ethylene oxide adduct/average number of moles of propylene oxide adduct

TABLE 4

| | Comparative Examples | | | |
|---|---|---|---|---|
| | 1 (Resin G) | 2 (Resin H) | 3 (Resin I) | 4 (Resin J) |
| Resin Monomers | | | | |
| Propylene Oxide Adduct | PO-1 = 3380 g (100) | PO-1 = 676 g (20) | PO-1 = 2028 g (60) | PO-1 = 2366 g (70) |
| Ethylene Oxide Adduct | — | EO-3 = 2464 g (80) | EO-3 = 1232 g (40) | EO-3 = 924 g (30) |
| Terephthalic Acid | 1162 g (70) | 1208 g (75) | 996 g (60) | 1162 g (70) |
| Trimellitic Acid | 288 g (20) | 159 g (12) | 360 g (25) | 245 g (17) |
| b/a*[1] | — | 1.00 | 1.00 | 1.00 |
| Physical Properties | | | | |
| Softening Point (° C.) | 107 | 95 | 142 | 115 |
| Glass Transition Temp. (° C.) | 63 | 56 | 67 | 62 |

Note)
The figure in parenthesis of resin monomers represents a molar ratio when the total amount of the alcohol component is defined as 100 moles.
*[1]: average number of moles of ethylene oxide adduct/average number of moles of propylene oxide adduct

Examples 7 to 13 and Comparative Examples 5 to 7

Toners

One-hundred parts by weight of a resin binder as shown in Table 5, 5.0 parts by weight of a carbon black "Mogul L" (commercially available from Cabot Corporation), 1.0 part by weight of a charge control agent "T-77" (commercially available from Hodogaya Chemical Co., Ltd), 2 parts by weight of a polypropylene wax "NP-105" (commercially available from MITSUI CHEMICALS, INC., a melting point of 140° C.), and 1.0 part by weight of a carnauba wax "Carnauba Wax C1" (commercially available from Kato Yoko, melting point: 83° C.) were sufficiently mixed with a Henschel mixer. Thereafter, the mixture was melt-kneaded using a co-rotating twin-screw extruder having an entire length of the kneading portion of 1560 mm, a screw diameter of 42 mm and a barrel inner diameter of 43 mm. The heating temperature within the roller was 120° C., the rotational speed of the roller was 200 r/min, the feeding rate of the raw material mixture was 10 kg/h, and the average residence time was about 18 seconds.

The resulting kneaded product was rolled with a cooling roller, pulverized with a jet mill, and classified, to give mother toner particles having a volume-median particle size ($D_{50}$) of 6.5 μm. The amount 0.7 parts by weight of "TS-530" (hydrophobic silica, commercially available from Cabot Corporation) and 1.5 parts by weight of "SI-Y" (hydrophobic silica, commercially available from Nippon Aerosil Co., LTD.) were added as external additives to 100 parts by weight of the mother toner particles, and the mixture was mixed with a 10-liter Henschel mixer at a rotational speed of 3000 r/min for 3 minutes, to give toners of Examples 7 to 13 and Comparative Examples 5 to 7 which were treated by the external additives. The evaluation of Test Example 2 was carried out for each toner.

On the other hand, a part of the kneaded mixture obtained above was cooled, and the cooled mixture was roughly pulverized to a size of 2 mm or less using a sieve having openings of 2 mm with a pulverizer "Rotoplex" (commercially available from Hosokawa Micron Corporation). Thereafter, the roughly pulverized product was finely pulverized with "IDS type 2" (commercially available from Nippon Pneumatic Mfg. Co., Ltd.). As conditions of the fine pulverization, a roughly pulverized product was pulverized using a hemi-cylindrical impact member obtained by cutting a cylinder of which bottom side is a true circle having a radius of 10 mm perpendicular to the bottom side to divide the cylinder into half, adjusting the pressure of pulverization air to 0.5 MPa, and adjusting an interval of an impact panel and a nozzle to 20 mm, to give a finely pulverized product having a volume-median particle size ($D_{50}$) of 5.5 μm. The evaluation of Test Example 1 was carried out for the resulting pulverized product.

Test Example 1

Pulverizability

Particle size distribution of the resulting pulverized product was determined using Coulter Multisizer II (commercially available from Beckman Coulter K.K.). The pulverizability was evaluated in accordance with the following evaluation criteria. The results are shown in Table 5.

[Evaluation Criteria of Pulverizability]

A: Particles having a particle size of 3 μm or less being 25% by number or less;

B: Particles having a particle size of 3 μm or less being more than 25% by number and 30% by number or less;

C: Particles having a particle size of 3 μm or less being more than 30% by number and 35% by number or less;

D: Particles having a particle size of 3 μm or less being more than 35% by number and 40% by number or less; and E: Particles having a particle size of 3 μm or less being more than 40% by number.

Here, A, B, C, and D are at a level for practical use.

Test Example 2

Low-Temperature Fixing Ability

The each of toners of Examples 7 to 13 and Comparative Examples 5 to 7 was loaded in a copy machine "AR-505" (commercially available from Sharp Corporation), and image-printing was carried out as an unfixed image (printing area: 2 cm×12 cm, amount of toner adhesion: 0.5 mg/cm$^2$). The unfixed image was fixed on a sheet at 150 mm/sec with a fixing device in the above-mentioned copy machine off-line, while sequentially raising the fixing temperature from 90° to 240° C. in increments of 5° C. A sand-rubber eraser (bottom area: 15 mm×7.5 mm), to which a load of 500 g was applied was rubbed backward and forward five times over the resulting image. The optical reflective densities of the images before and after rubbing test were measured with a reflective densitometer "RD-915" (commercially available from Macbeth Process Measurements Co.). The temperature of the fixing roller at which the ratio of the both optical reflective densities (after rubbing/before rubbing) initially exceeds 70% was defined as the lowest fixing temperature. The low-temperature fixing ability was evaluated in accordance with the following evaluation criteria. The results are shown in Table 5. Here, the sheets used for fixing were "CopyBond SF-70NA" (commercially available from Sharp Corporation, 75 g/m$^2$).

[Evaluation Criteria of Low-Temperature Fixing Ability]

A: Lowest fixing temperature being 140° C. or lower;

B: Lowest fixing temperature being from 145° to 160° C.; and

C: Lowest fixing temperature being 165° C. or higher.

Here, A and B are at a level for practical use.

TABLE 5

| | Resin Binder (Parts by Weight) | Pulverizability | Low-Temperature Fixing Ability |
|---|---|---|---|
| Ex. 7 | Resin A/Resin I = 50/50 | A | A |
| Ex. 8 | Resin B/Resin I = 50/50 | B | A |
| Ex. 9 | Resin C/Resin I = 50/50 | A | B |
| Ex. 10 | Resin D/Resin I = 50/50 | C | B |
| Ex. 11 | Resin E/Resin I = 50/50 | D | B |
| Ex. 12 | Resin F/Resin I = 50/50 | B | B |
| Ex. 13 | Resin A/Resin I = 60/40 | B | B |
| Comp. Ex. 5 | Resin G/Resin I = 50/50 | E | C |
| Comp. Ex. 6 | Resin H/Resin I = 50/50 | E | B |
| Comp. Ex. 7 | Resin I = 100 | A | C |

It can be seen from the above results that the toners of Examples are excellent in both pulverizability and low-temperature fixing ability, as compared to the toners of Comparative Examples. In addition, it can be seen from the comparison between Examples 7 and 9 that a toner using an alcohol component containing in a large amount of the ethylene oxide adduct is inferior in low-temperature fixing ability, and from the comparison between Examples 7 and 12 that a toner using an adduct having a high number of moles of the ethylene oxide adduct is excellent in low-temperature fixing ability and pulverizability. Therefore, it can be seen that it is important to increase the number of moles of the ethylene oxide adduct, not only to simply increase the content of the ethylene oxide adduct.

The polyester for a toner of the present invention is suitably used as a resin binder of a toner, or the like, used for, for example, developing a latent image formed in electrophotography, electrostatic recording method, electrostatic printing method, or the like.

The present invention being thus described, it will be obvious that the same may be varied in ways. Such variations are not to be regarded as a departure from the spirit and scope of the invention, and all such modifications as would be obvious to one skilled in the art are intended to be included within the scope of the following claims.

What is claimed is:

1. A polyester for a toner having a softening point of from 70° C. to 110° C. and a glass transition temperature of from 38° C. to 60° C., obtained by polycondensing an alcohol component comprising a propylene oxide adduct of bisphenol A and an ethylene oxide adduct of bisphenol A in a total amount of 95% by mole or more, with a carboxylic acid component, wherein the propylene oxide adduct of bisphenol A has an average number of moles of from 2.0 to 2.4, and the ethylene oxide adduct of bisphenol A has an average number of moles of from 3.1 to 3.5, a ratio of the average number of moles of the propylene oxide adduct of bisphenol A (a) and the average number of moles of the ethylene oxide adduct of bisphenol A (b), b/a, is from 1.1 to 1.4, and a mole ratio of the propylene oxide adduct to the ethylene oxide adduct in the alcohol component is from 5/95 to 30/70.

2. The polyester according to claim 1, wherein the propylene oxide adduct of bisphenol A is contained in an amount of from 0.5 to 40% by mole, of the alcohol component.

3. The polyester according to claim 1, wherein the ethylene oxide adduct of bisphenol A is contained in an amount of from 40 to 99% by mole, of the alcohol component.

4. The polyester according to claim 1, wherein the carboxylic acid component comprises an aromatic dicarboxylic acid.

5. A process for preparing a polyester for a toner having a softening point of from 70° C. to 110° C. and a glass transition temperature of from 38° C. to 60° C., comprising polycondensing an alcohol component comprising a propylene oxide adduct of bisphenol A and an ethylene oxide adduct of bisphenol A in a total amount of 95% by mole or more, with a carboxylic acid component, wherein the propylene oxide adduct of bisphenol A has an average number of moles of from 2.0 to 2.4, and the ethylene oxide adduct of bisphenol A has an average number of moles of from 3.1 to 3.5, a ratio of the average number of moles of the propylene oxide adduct of bisphenol A (a) and the average number of moles of the ethylene oxide adduct of bisphenol A (b), b/a, is from 1.1 to 1.4, and a mole ratio of the propylene oxide adduct to the ethylene oxide adduct in the alcohol component is from 5/95 to 30/70.

6. The process according to claim 5, wherein the polycondensation of the alcohol component and the carboxylic acid component is carried out in the presence of a titanium compound and/or a tin (II) compound without having a Sn—C bond.

7. A toner comprising the polyester according to claim 1.

8. The toner according to claim 7, further comprising an additional polyester having a softening point from 125° C. to 160° C.

9. The polyester according to claim 1, wherein the ratio b/a is from 1.2 to 1.4.

* * * * *